United States Patent [19]

McKechnie et al.

[11] 3,720,007
[45] March 13, 1973

[54] VISUAL DISPLAY SIMULATOR

[75] Inventors: John C. McKechnie, Maitland; Paul D. Grimmer, Winter Park, both of Fla.

[73] Assignee: The United States of America as represented by the Secretary of the Navy

[22] Filed: Jan. 4, 1971

[21] Appl. No.: 103,462

[52] U.S. Cl..........................35/12 N, 178/6, 340/380, 350/96
[51] Int. Cl..............................G09b 9/08, B64g 7/00
[58] Field of Search .........35/12 N; 350/96; 340/380; 178/6

[56] References Cited

UNITED STATES PATENTS 3,389,950   6/1968   Harper .................................178/6
3,328,594   6/1967   Sheldon ..........................340/380 X
3,446,916   5/1969   Abel et al. .................................178/6
3,052,753   9/1962   Schwarz et al....................35/12 N X
3,422,207   1/1969   Flower et al......................35/12 N X Primary Examiner—Robert W. Michell
Assistant Examiner—L. R. Oremland
Attorney—Richard S. Sciascia, John W. Pease and Harvey A. David

[57]   ABSTRACT

A visual display simulator is described wherein a scene is viewed by a pinhole lens element which casts images of the scene on a fiber-optic bundle for transmittal to a T.V. camera tube unit of a closed circuit T.V. having a display unit viewable by a trainee. The pinhole lens element is positionable by a roll, pitch, and yaw drive means about three orthogonal axes intersecting at the pinhole, and is also positionable in translation by other drive means.

3 Claims, 6 Drawing Figures

John C. McKechnie
Paul D. Grimmer
INVENTORS

By Harvey A. David
Attorney

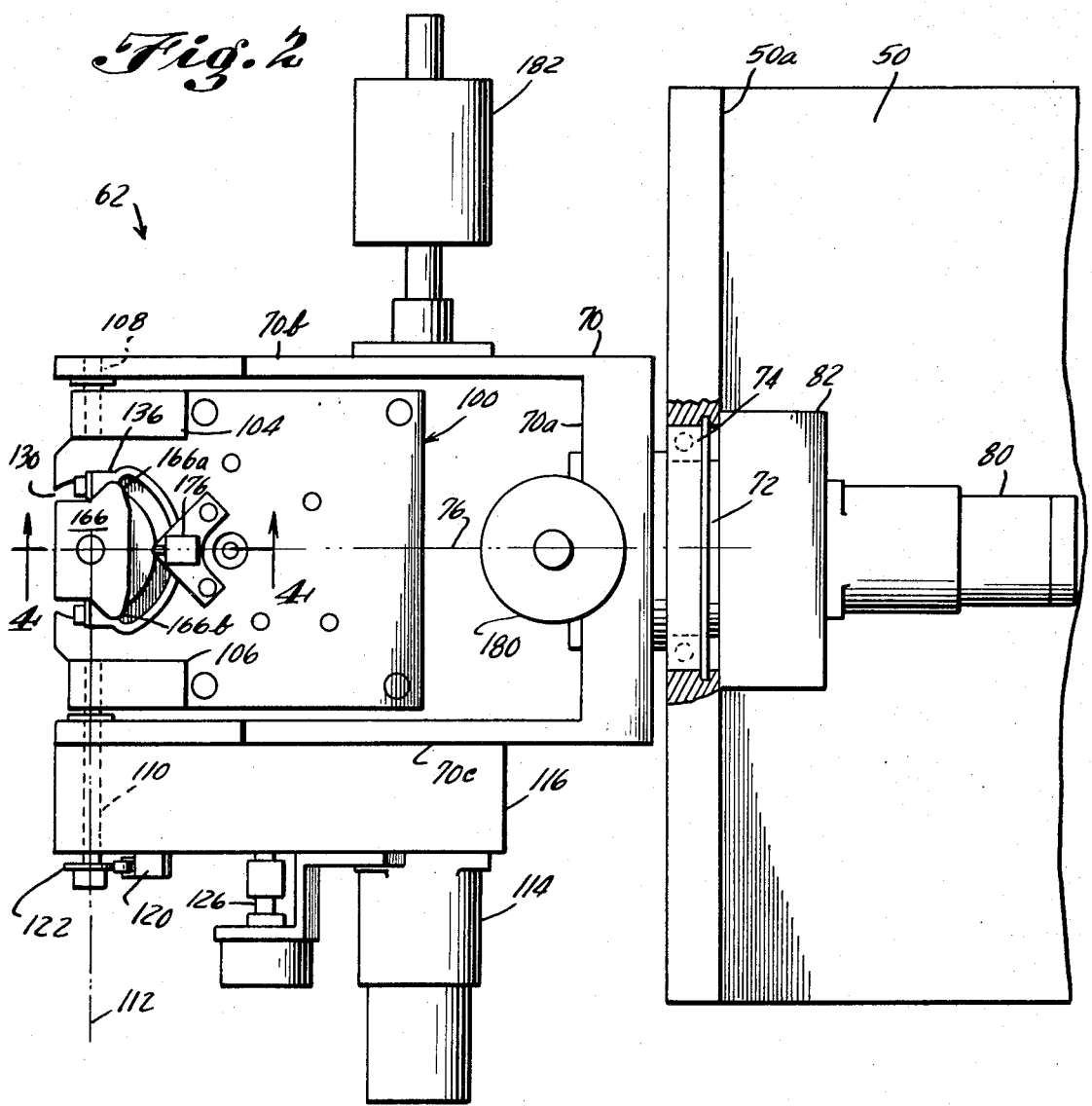

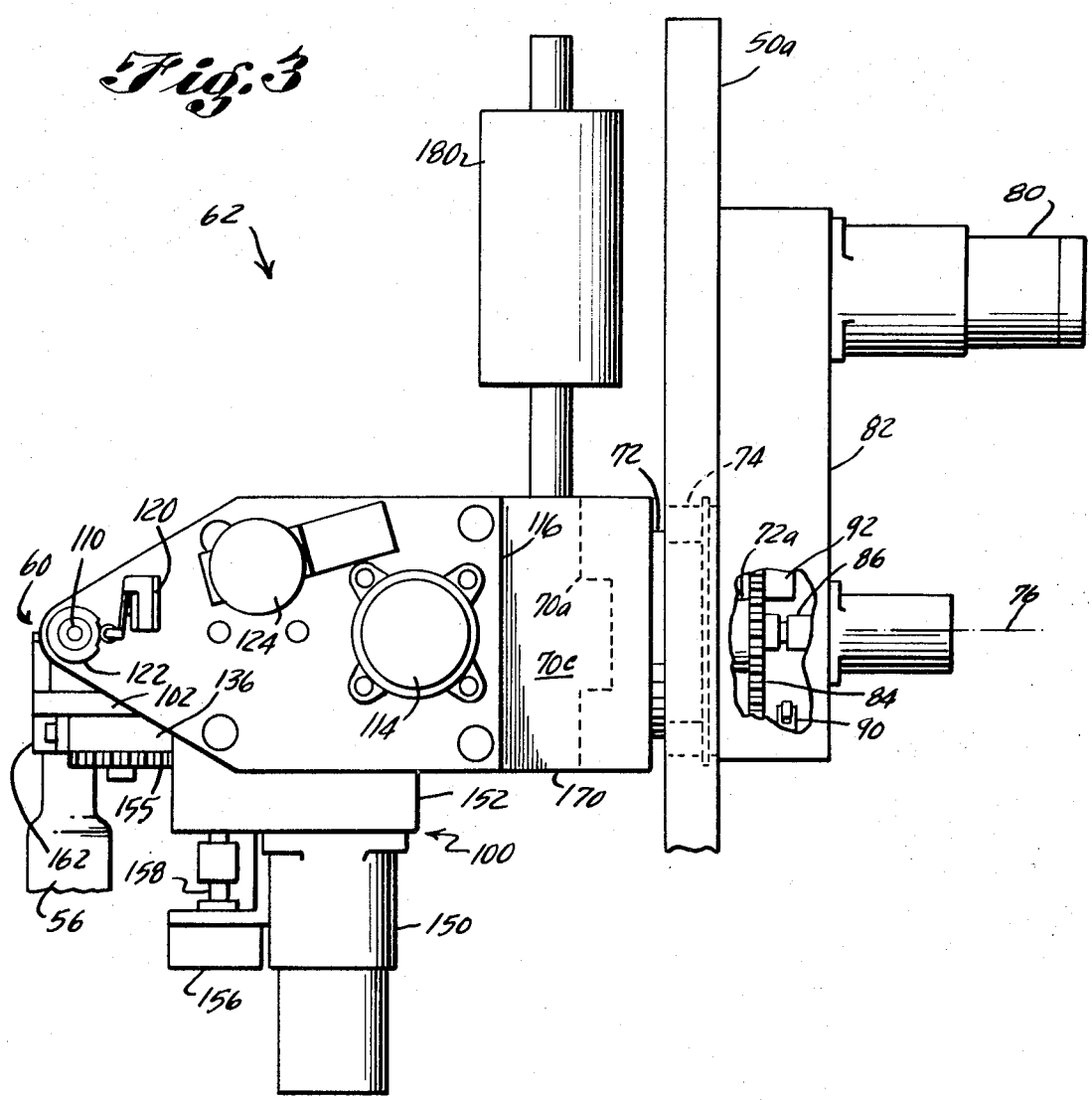
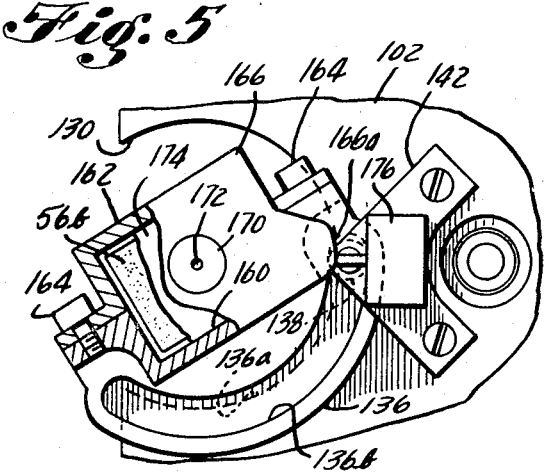

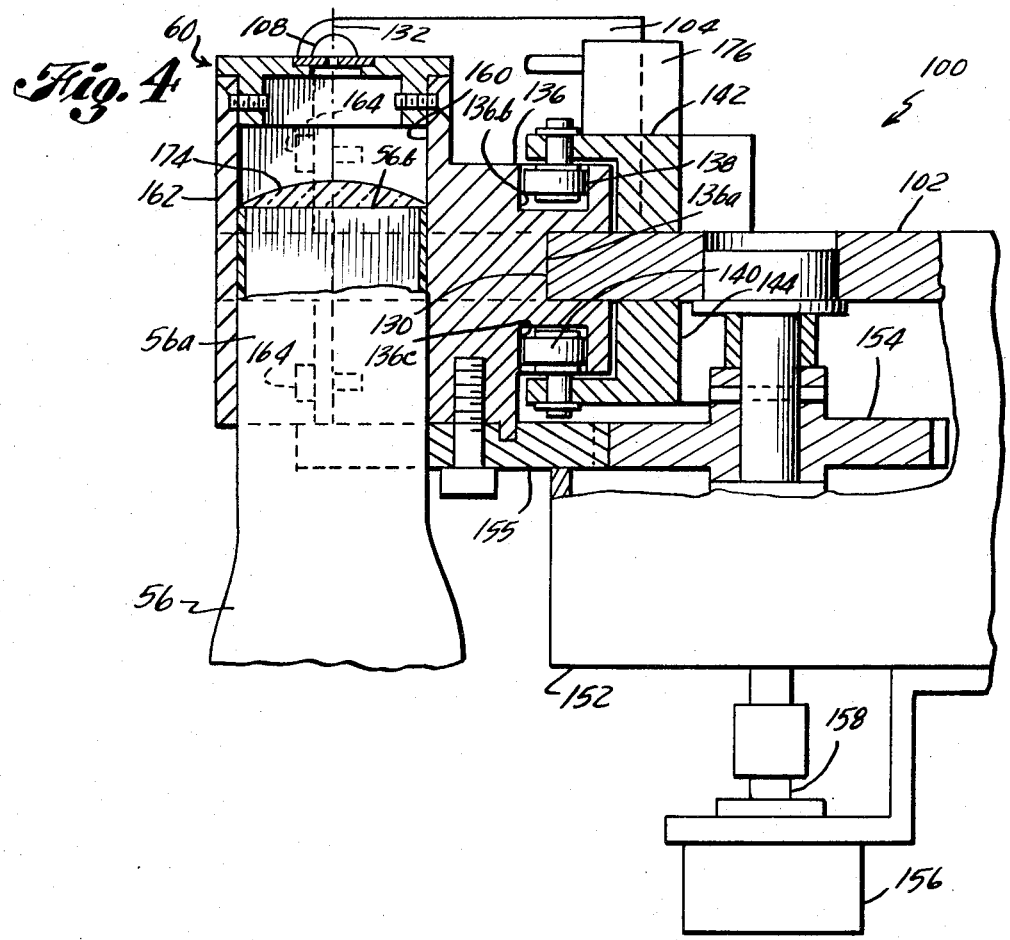
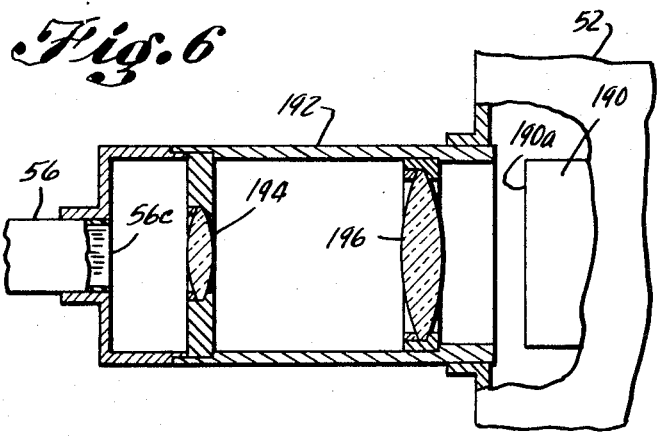
John C. McKechnie
Paul D. Grimmer
INVENTORS
By Harvey A. David
Attorney

VISUAL DISPLAY SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to visual display simulators such as form part of flight trainers, and more particularly to simulators of the type wherein a closed circuit T.V. system is used to generate a visual display from a model or photographic scene. In such simulators relative movement between the T.V. camera, any intermediary lenses, mirrors or prisms, and the scene are in response to movements of simulated controls effected by a trainee viewing the display. The simulators described in U.S. Pat. No. 2,979,832 and U.S. Pat. No. 3,076,271 are typical of this arrangement.

Among the shortcomings of such simulators as have been in use are included the limited field of view of even so-called wide angle television lenses, the limited depth of field of such lenses, distortions introduced by lenses, the mass of the cameras and lenses which must be moved by servo systems in response to trainee controls, and the fact that the size of the lens limits its approach to the scene. The latter limitation is of particular importance in simulating aircraft landings on a carrier or landing strip. This problem has been met in part by using mirrors or prisms mounted close to the scene and movable by servo means to reflect the scene to the camera and at times to introduce changing aspect resulting from movement in one or more of the six degrees of freedom experienced by an aircraft. The resulting complexity of servo systems and the problems of camera, mirror, lens, and scene alignments of such a system are considerable.

SUMMARY OF THE INVENTION

With the foregoing in mind, it is a principal object of this invention to provide an improved visual display simulator embodying closed circuit T.V. for rendering an enlarged presentation of a scene or portions thereof to a trainee, and which simulator substantially reduces the aforementioned limitations of the prior art devices.

As another object, this invention aims to accomplish the foregoing through the provision of a closed circuit T.V. system wherein a pinhole is used as a lens in combination with a flexible fiber-optic bundle for transmitting images of the scene to a T.V. camera tube. The invention includes novel roll, pitch, and yaw drive means for positioning the pinhole lens means about the orthogonal axes of roll, pitch, and yaw which intersect at the entrance pupil of the pinhole lens means, while the roll, pitch, and yaw drive means and the pinhole lens means are movable in translation with respect to the scene by $x$, $y$, and $z$ drive means.

These and other objects and advantages of the present invention will become apparent from the following detailed description of a presently preferred embodiment thereof when read in conjunction with the accompanying sheets of drawings.

DESCRIPTION OF THE DRAWINGS

FIG. 2 is a plan elevational view of the roll, pitch, and yaw drive means of the simulator of FIG. 1;

FIG. 3 is a side elevational view, with portions broken away for clarity, of the roll, pitch, and yaw drive means of FIG. 2;

FIG. 4 is a sectional view, on an enlarged scale, taken substantially along line 4—4 of FIG. 2;

FIG. 5 is an enlarged fragmentary plan view of a portion of the drive means of FIG. 2 showing some parts in different operating positions; and FIG. 6 is a longitudinal sectional view illustrating the interface between the fiber-optic bundle and the T.V. camera tube of the simulator of FIG. 1.

DESCRIPTION OF THE PREFERRED EMBODIMENT

Figure 1:
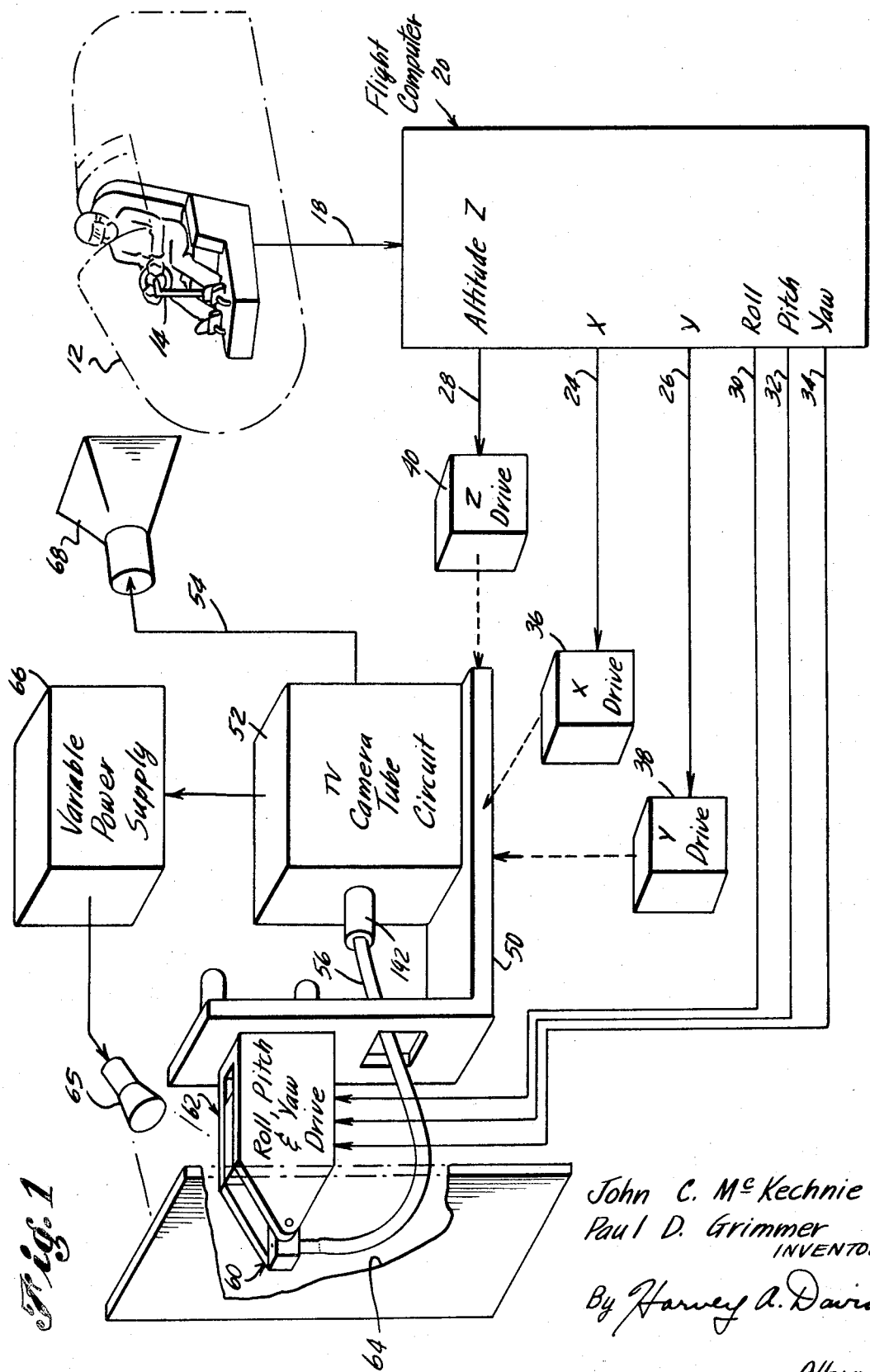
FIG. 1 is a diagrammatic illustration of a flight trainer utilizing a visual display simulator embodying the invention.

In the form of the invention illustrated in the drawings and described hereinafter, there is provided a flight training simulator, generally indicated at 10 in FIG. 1, comprising a simulated cockpit 12 having controls 14 which can be manipulated by a trainee 16 during a training session, for example in making an approach and landing on an airstrip. The positioning of the controls 14 produces signals which are applied as indicated collectively by flow line 18 to a flight computer 20. The flight computer 20, which may be in any of the several forms well known by those skilled in the art to which the invention pertains, as for example the REAC 550, manufactured by the Reeves Instrument Co, Boynton Beach Fla., or the SIGMA-7 manufactured by XEROX Corp. of El Segundo, Cal., converts steering, speed, flap, etc., control changes effected by the trainee 16 into output signals corresponding to the six freedoms of motion of an aircraft including roll, pitch, yaw, $x$ and $y$ coordinates of translational position, and a $z$ coordinate representing altitude.

These output signals of the computer 20 are represented by flow lines 24, 26, 28, 30, 32, and 34. The $x$, $y$, and $z$ signals are applied via lines 24, 26, and 28 to an $x$ drive unit 36, a $y$ drive unit 38, and a $z$ drive unit 40, connected as indicated by dotted lines 42, 44, and 46 respectively, to a movable table 50.

Mounted on the table 50 for movement therewith is a television camera tube unit 52. The camera tube unit 52 is adapted to convert into electronic video signals, represented by line 54, images conveyed thereto via a flexible fiber-optic bundle 56 from a pinhole lens means 60. The pinhole lens means 60, or optical probe, which is described in more detail hereinafter, is carried and positioned by a roll, pitch, and yaw drive means 62. The drive means 62 is conveniently mounted on an upright portion 50a of the table 50, and serves to position the pinhole lens element about roll, pitch and yaw axes, all of which intersect in the plane of the entrance pupil of the means 60, so as to view a scene 64 which may be either a three dimensional or a two dimensional scene such as a photograph of terrain including a landing strip or the like. This scene 64 may be either front lighted by illumination means 65 in case of an opaque scene, or may be back lighted in case of a transparent or translucent scene. In either case the degree of illumination may advantageously be automatically varied by a variable power supply 66 in response to changes in position of the pinhole lens means 60 in order to maintain a substantially constant degree of brightness in the displayed scene. Alternatively, or in combination therewith, electronic automatic gain control means can be incorporated in the electronics of the closed circuit T.V. system to control the variable power supply 66. The video output on line 54 is converted by a T.V. display means 68 into a visual display which the trainee 16 can use for training in use of visual cues during landing or other maneuvers.

Referring to FIGS. 2 – 5, the combination of the pinhole lens means 60, fiber-optic bundle 56, and roll, pitch, and yaw drive 62 will be described in more detail.

Thus, the yaw, pitch and roll drive 62 comprises a U-shaped support member 70 having a base portion 70a from which extend spaced side plate portions 70b and 70c. The base portion 70a has extending therefrom a hub 72 which is journalled for rotation in the portion 50a of the movable table 50 by suitable antifriction bearing means 74 for rotation of the member 70 about a first or yaw axis 76. Such rotation is effected by reversible drive motor 80 operating through a gear unit 82. As is best illustrated in FIG. 3, the last gear 84 of gear unit 82 is connected to portion 72a of the hub 72 and is also connected through shaft means 86 to a position sensing means in the form of a control transformer 88. The latter forms part of conventional circuitry, not shown, for terminating operation of the motor 80 when the position commanded by the computer 20 is achieved. Limits on the range of rotation about the yaw axis 76 are established by a limit switch 90 which is actuable by a cam element 92 carried by the gear 84.

Mounted between the side plate portions 70b and 70c is a pitch and roll assembly generally indicated at 100. This assembly comprises a plate 102 having a pair of spaced trunnion blocks 104, 106 extending upwardly therefrom and from which extend trunnion shafts 108 and 110, respectively. The trunnion shafts are journalled in the side plates 70b and 70c of the rotatable support member 70 and provide for movement of the assembly 100 about a pitch axis 112 (FIG. 2).

Movement of the assembly 100 about the pitch axis 112 is effected by a reversible motor 114 which is connected to the shaft 110 through a reduction gear unit 116 mounted on the side plate 70c. The details of the gearing are conventional, and accordingly are not shown. Suffice it to say that the assembly 100 is limited in its excursions about the pitch axis 112 by actuation of a limit switch 120 by a cam 122 on shaft 110, while the position of the assembly at any time is sensed by a potentiometer 124, the shaft 126 of which is connected to a shaft carrying one of the gears within the unit 116.

Referring to FIGS. 4 and 5, the plate 102 is characterized by a partial circular cut-out 130, the center of which lies on a roll axis 132 which is normal to, and intersects both the yaw axis 76 and the pitch axis 112. Mounted in the partial circular cut-out 130 for rotational movement about the roll axis 132 is a block 136 which is generally semi-circular in plan configuration. The block 136 has defined therein a semi-circular groove 136a receiving the edge of the plate 102 defining the cut-out 130. The block 136 further has defined therein arcuate grooves 136b and 136c, the larger radiused curved surfaces of which cooperate with rollers 138 and 140 which are supported by brackets 142 and 144, respectively, from opposite sides of the plate 102. These rollers assure smooth rotation of the block 136 without binding.

Rotation of the block 136 is effected by a reversible electric motor 150 operating through a reduction gear unit 152 mounted on the plate 102 and the last gear 154 of which cooperates with a gear sector 155 secured to the bottom of the block. A potentiometer 156, having its shaft 158 suitably connected to a gear shaft of the unit 152, serves to sense the rotational position of the block 136.

The block 136 has a rectangular channel 160 defined therein which receives the rectangular end portion 56a of the fiber-optic bundle 56. A clamping member 162, having a hat shaped section as seen in FIG. 5, is secured by screws 164 to the block 136 and clamps the fiber-optic bundle end portion 156a in the channel 160 of the block 136. A plate 166, having ears 166a and 166b, is secured to the clamping member 162 and block 136 in spaced, parallel relation to the end surface 56b of the fiber-optic bundle. An aperture member 170 having an aperture 172, referred to as a pinhole, serves to focus images of the scene 64 on the surface 56b through a collimating lens 174. The plate 166 and aperture member 170 comprise the pinhole lens element generally indicated as 60 in FIG. 1. The images formed thereby are transmitted via the fiber-optic bundle 56 to the T.V. camera tube unit 52.

The ears 166a and 166b of plate 166 serve as cam surfaces for actuation of a limit switch 176 to prevent rotation of the block 136, the end portion 56a of the bundle 56, and the associated pinhole lens means 60 beyond predetermined limits about the roll axis 132.

The roll, pitch, and yaw drive means 62 is provided with counter-weight means 180 and 182 mounted on the member 70 in an orthogonal manner to balance the masses of the motors 114 and 150 and their associated gear units 116 and 152.

The center of the pinhole 172 lies on the intersection of the roll, pitch, and yaw axes whereby any one or combination of the roll, pitch, and yaw movements of the pinhole lens means 60 about the entrance pupil will merely affect the direction in which the device "looks" at the scene 64, without any displacement from the position relative to the scene established by the movable table 50.

It will be appreciated that the roll, pitch, and yaw drive means in combination with the pinhole lens element and flexible fiber-optic bundle results in a particularly low inertia optical probe, thereby permitting fine control and fast response of the direction thereof with low powered drive motors and correspondingly light gear units. In addition, the use of a pinhole lens eliminates problems of focus throughout the depth of field and irrespective of the angle of the plane of the pinhole with respect to a viewed object. Moreover, the field of view of the pinhole is extremely wide-angle, 130° of view having been readily achieved in practice. The pinhole provides nearly absolute linearity of the transmitted scene with no optically generated distortion. In one practical embodiment a pinhole of 0.006 inch in diameter has been used in combination with an RCA C21093 T.V. image isocon camera tube and associated electronics, with good results.

In one practical embodiment of the invention a 35 mm fiber-optic bundle 56 is used while the T.V. camera tube unit 52 employs a camera tube the image sensitive face of which is 50 mm. Accordingly, and as illustrated in FIG. 6, an interface is provided between the bundle 56 and the camera tube 190. This interface comprises a lens tube 192 which holds the light emitting end 56b of the bundle 56 in spaced relation to an object lens 194 which cooperates with a field lens 196 to focus enlarged images from the bundle onto the light sensitive surface or screen 190a of the camera tube.

From the foregoing detailed description of a preferred embodiment of the invention it will be appreciated that the previously stated objects and advantages, as well as others, have been achieved. Obviously many modifications and variations of the present invention are possible in the light of the above teachings. It is therefore to be understood that within the scope of the appended claims the invention may be practiced otherwise than as specifically described.

What is claimed is:

1. A visual display simulator comprising:
   a scene viewable from one side and having at least two dimensions;
   pinhole lens means for viewing said scene;
   roll, pitch, and yaw drive means supporting said pinhole lens means and operative to position said pinhole lens means about roll, pitch, and yaw axes which are orthogonal and intersect at the entrance pupil of said pinhole lens means;
   translation drive means connected to said roll, pitch, and yaw means for effecting translational movement of said pinhole lens means with respect to said scene;
   a T.V. camera tube unit comprising a scanning tube;
   flexible fiber-optic image conducting means having one end connected to receive images through said pinhole lens means and having the other end coupled to said scanning tube;
   T.V. display means connected to said camera tube unit and operative to display images corresponding to the view of said scene by said pinhole lens means;
   a trainee station including controls operable by a trainee;
   computer means responsive to said control means to provide roll, pitch, and yaw and translational drive command signals;
   said roll, pitch, and yaw drive means and said translational drive means being responsive to said command signals to position said pinhole lens means in roll, pitch, yaw, and translation.

2. A visual display simulator as defined in claim 1, and wherein said roll, pitch, and yaw drive means comprises:
   a first member having a base portion and two spaced side portions extending from the base portion;
   bearing means supporting said member for rotation about said yaw axis;
   a first reversible motor and gear means connected to said member for effecting said rotation;
   a second member comprising a plate portion disposed between said side portions of said first member and having trunnion shaft means extending therefrom, said shaft means being journalled in said side portions for rotation of said second member about said pitch axis, said plate portion having a partial circular cut-out defined therein;
   a third member comprising a block rotatably disposed in said cut-out and having a semi-circular groove accommodating the edges of said plate portion defining said cut-out, said third member being rotatable about said roll axis;
   a second reversible motor and gear means mounted on one of said side portions and connected to said shaft means for effecting said rotation of said second member about said pitch axis;
   a third reversible motor and gear means mounted on said second member and connected to said third member for effecting said rotation thereof about said roll axis; and
   said pinhole lens means being mounted on said third member for movement therewith.

3. A visual display simulator comprising:
   a scene viewable from one side and having at least two dimensions;
   pinhole lens means for viewing said scene;
   roll, pitch, and yaw drive means supporting said pinhole lens means and operative to position said pinhole lens means about roll, pitch, and yaw axes which are orthogonal and intersect at the entrance pupil of said pinhole lens means;
   translation drive means connected to said roll, pitch, and yaw means for effecting translational movement of said pinhole lens means with respect to said scene;
   a T.V. camera tube unit comprising a scanning tube;
   flexible fiber-optic image conducting means having one end connected to receive images through said pinhole lens means and having the other end coupled to said scanning tube;
   T.V. display means connected to said camera tube unit and operative to display images corresponding to the view of said scene by said pinhole lens means;
   light source means for illumination of said scene;
   variable power supply means connected to said light source means and responsive to changes in position of said pinhole lens means relative to said scene to vary said illumination;
   said roll, pitch, and yaw drive means comprising,
   a first member having a base portion and two spaced side portions extending from the base portion;
   bearing means supporting said member for rotation about said yaw axis;
   a first reversible motor and gear means connected to said member for effecting said rotation;
   a second member comprising a plate portion disposed between said side portions of said first member and having trunnion shaft means extending therefrom, said shaft means being journalled in said side portions for rotation of said second member about said pitch axis, said plate portion having a partial circular cut-out defined therein;
   a third member comprising a block rotatably disposed in said cut-out and having a semi-circular groove accommodating the edges of said plate portion defining said cut-out, said third member being rotatable about said roll axis;

a second reversible motor and gear means mounted on one of said side portions and connected to said shaft means for effecting said rotation of said second member about said pitch axis;

a third reversible motor and gear means mounted on said second member and connected to said third member for effecting said rotation thereof about said roll axis; and said pinhole lens means being mounted on said third member for movement therewith.

* * * * *